United States Patent
Sivakumar et al.

(10) Patent No.: US 9,760,236 B2
(45) Date of Patent: Sep. 12, 2017

(54) VIEW VIRTUALIZATION AND TRANSFORMATIONS FOR MOBILE APPLICATIONS

(71) Applicant: StarMobile, Inc., Atlanta, GA (US)

(72) Inventors: Raghupathy Sivakumar, Atlanta, GA (US); Sandeep Kakumanu, Atlanta, GA (US); Cheng-Lin Tsao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/651,593

(22) Filed: Oct. 15, 2012

(65) Prior Publication Data
US 2013/0174047 A1    Jul. 4, 2013

Related U.S. Application Data

(60) Provisional application No. 61/547,329, filed on Oct. 14, 2011.

(51) Int. Cl.
*G06F 3/00* (2006.01)
*G06F 3/0481* (2013.01)
*G06F 9/44* (2006.01)

(52) U.S. Cl.
CPC .......... *G06F 3/0481* (2013.01); *G06F 9/4443* (2013.01)

(58) Field of Classification Search
CPC .... G06F 9/44; G06F 17/30905; G06F 3/0481; G06F 17/30899; G06F 3/0484
See application file for complete search history.

(56) References Cited

U.S. PATENT DOCUMENTS

| | | | |
|---|---|---|---|
| 6,882,659 B1 | 4/2005 | Novak et al. | |
| 6,915,328 B2 | 7/2005 | Turnbull | |
| 6,928,648 B2 | 8/2005 | Wong et al. | |
| 7,213,228 B2* | 5/2007 | Putterman | 717/109 |
| 7,574,653 B2 | 8/2009 | Croney et al. | |
| 7,574,691 B2* | 8/2009 | Freitas et al. | 717/113 |
| 7,673,245 B2* | 3/2010 | Weddeling et al. | 715/746 |
| 2006/0174026 A1 | 8/2006 | Robinson et al. | |
| 2006/0256130 A1* | 11/2006 | Gonzalez | 345/619 |
| 2007/0061488 A1 | 3/2007 | Alagappan et al. | |

(Continued)

FOREIGN PATENT DOCUMENTS

| | | |
|---|---|---|
| WO | WO2010/113160 | 10/2010 |
| WO | WO2011/101691 | 8/2011 |

*Primary Examiner* — Mahelet Shiberou
(74) *Attorney, Agent, or Firm* — Smith, Gambrell & Russell

(57) ABSTRACT

Application mobilization has assumed importance given the proliferation of smartphones amongst the enterprise workforce, and other users. Existing techniques to mobilize applications incur high overheads in terms of time, cost, and effort. Remote computing is a promising basis for application mobilization that has the advantages of zero code rewriting, full functionality applications, and seamless IT manageability. However, it has the major disadvantage of presenting a cumbersome PC application view on the smartphone. In this context the present invention, referred to as *Mobile, is described to perform dynamic transformation of application views for smartphones. Significant performance gains may be achieved by using this system and methodology.

18 Claims, 8 Drawing Sheets

(56) References Cited

U.S. PATENT DOCUMENTS

| | | |
|---|---|---|
| 2007/0130523 A1 | 6/2007 | Ku et al. |
| 2008/0148235 A1* | 6/2008 | Foresti et al. ............... 717/123 |
| 2009/0013173 A1 | 1/2009 | Savage |
| 2009/0063988 A1* | 3/2009 | Graeff et al. ................ 715/744 |
| 2009/0307658 A1* | 12/2009 | Freitas et al. ................ 717/113 |
| 2011/0025706 A1* | 2/2011 | Etelapera ..................... 345/619 |
| 2011/0078594 A1* | 3/2011 | Guertler et al. ............ 715/763 |
| 2011/0091112 A1 | 4/2011 | Engtrom et al. |
| 2011/0106876 A1 | 5/2011 | Delaney |
| 2011/0126158 A1* | 5/2011 | Fogarty et al. .............. 715/835 |
| 2011/0252318 A1* | 10/2011 | Helms .......................... 715/702 |
| 2012/0092277 A1* | 4/2012 | Momchilov .................. 345/173 |
| 2012/0226994 A1* | 9/2012 | Lee ............................... 715/746 |
| 2014/0082511 A1* | 3/2014 | Weissberg et al. ........... 715/740 |

* cited by examiner

VIEW VIRTUALIZATION AND TRANSFORMATIONS FOR MOBILE APPLICATIONS

CROSS REFERENCE TO RELATED PATENT APPLICATION

This application claims priority to U.S. Provisional Application No. 61/547,329, filed Oct. 14, 2011; U.S. patent application Ser. No. 13/256,749, filed Nov. 16, 2011; and U.S. patent application Ser. No. 13/415,507, filed Mar. 8, 2012, all of which are herein incorporated by reference in their entirety.

BACKGROUND

Enterprise applications represent an important class of software applications ranging in functionality from supply chain management and customer relationship management to human resources and payroll management. While such applications are traditionally offered on a PC platform, recent studies have shown that knowledge workers typically spend only one-third of their time physically at their desk, but are very likely to possess smartphones. Such trends have motivated enterprises to strategically invest in application mobilization, where applications hitherto accessible only on PC platforms are made accessible from smartphones as well.

Application mobilization is done today using one of three different strategies: (i) homegrown solutions where enterprises directly invest resources in developing custom mobilized applications; (ii) third party solutions where application vendors such as SAP, Oracle and Microsoft provide mobilization platforms that can in-turn be used by enterprises to mobilize applications with appropriate configurations; and (iii) cross platform solutions like web applications that are compatible with multiple platforms including smartphones. The above methodologies to mobilization however come with their respective limitations as discussed next.

The typical goals of an enterprise for application mobilization are the following: (i) low cost/time to mobilization, (ii) no major functionality loss, (iii) user friendly, and (iv) minimal changes to IT. Unfortunately, homegrown solutions incur considerable time/cost overheads and require major changes to enterprise IT to manage a new class of applications; third party solutions incur more reasonable, but substantial, overheads to configure, typically have much reduced functionality if they come pre-designed, and require major changes to enterprise IT processes; and cross platform solutions are typically quite cumbersome to use as the interface is originally designed for the PC platform and can support only limited functionalities compared to natively developed applications.

SUMMARY

It is to be understood that both the following general description and the following detailed description are exemplary and explanatory only and are not restrictive, as claimed.

The present invention may make use of remote computing as the basis for mobilization. Mobilizing an application may involve running a PC version of the application on a physical or virtual PC within the enterprise network and providing a remote view into that application on the smartphone. Remote computing offers several attractive benefits including zero code mobilization—as no application porting is required; full functionality applications—the entire PC application functionality is now available for use; and seamless manageability—the backend infrastructure can be managed with existing IT processes. The use of remote computing from mobile platforms is not new—Microsoft Remote Desktop Mobile, VMware View Mobile, and Citrix Receiver Mobile are examples. However, relying on remote computing as a primary means to use applications raises a major challenge: remote computing solutions typically assume homogeneous platforms on either end of the remote session, which in turn means that application views, originally developed for the PC, will be presented as-is on the smartphone making them cumbersome, if not impossible, to use. The present invention overcomes this challenge.

The present invention comprises a rapid mobilization solution, which we call *Mobile. The term *Mobile is simply used as a shorthand for the system and methodology of the present invention. *Mobile may be built atop a traditional remote computing solution, or it may be built independent of a remote computing solution. However, *Mobile may dynamically transform the application views in a manner that make them appropriate for the smartphone. The *Mobile design, in one embodiment, may comprise two components: (i) virtual view—that virtualizes application views independent of the UI framework used into a set of UI elements and attributes that can be easily manipulated; and (ii) transformation services—that can be programmed onto the *Mobile platform to operate on the virtual view during run-time in order to realize a smartphone friendly view. User-studies based on a sample prototype implementation show that *Mobile can reduce time-to-task by up to 66%, reduce actions-per-task by up to 85%, and reduce traffic consumption by up to 78%.

In one embodiment of the present invention, mobilization of typical enterprise applications is performed. Both stand-alone and client-side of client-server windows-based applications may be mobilized, but the design principles themselves can be extended to other OSes and web platforms as well. While the design is independent of the smartphone platform (Apple iOS, Android, etc.), in one sample prototype implementation, the Android OS for smartphones may be used.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
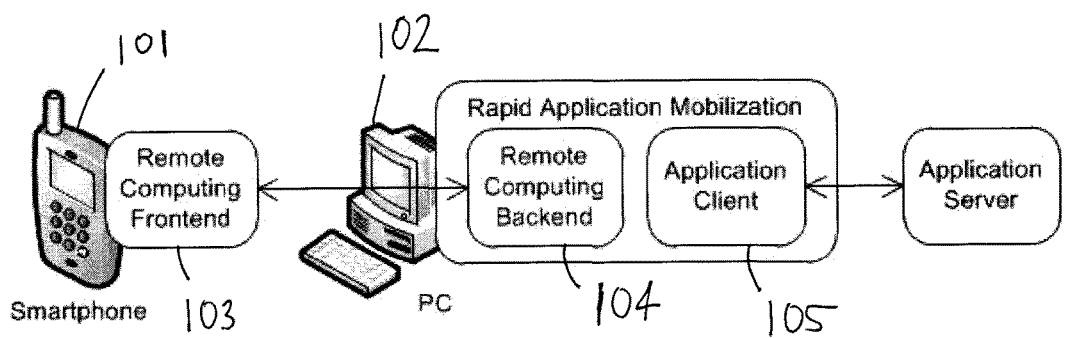
FIG. 1 depicts a remote computing architecture.

The subject disclosure may be understood more readily by reference to the following detailed description of exemplary embodiments of the subject disclosure and to the Figures and their previous and following description.

Before the present systems, devices, and methods are disclosed and described, it is to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

As employed in this specification and annexed drawings, the terms "unit," "component," "interface," "system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "platform" can be utilized interchangeably.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Reference will now be made in detail to the various embodiments, aspects, and features of the subject disclosure, examples of which are illustrated in the accompanying drawings. Wherever possible, the same reference numbers are used throughout the drawings to refer to the same or like parts.

Since remote computing is used as a building block in *Mobile, a short primer on the technology and how it may be used for mobilization is presented. FIG. 1 illustrates remote computing from a smartphone 101, in one embodiment. A remote computing server 104 runs on the backend PC 102. A remote computing client 103 runs on the smartphone 101, receives updates to desktop views from the server 104, and renders them. The client 103 sends back any user-input, and the server 104 executes the input on the PC 102. Virtual network computing (VNC) and Remote desktop protocol (RDP) are both examples of remote computing solutions. In VNC the server 104 sends raw pixel information, while in RDP the server 104 sends graphical primitives and commands.

Remote computing can be used as a mobilization strategy by simply running the application that requires mobilization on a PC backend 104, and providing a view of that application's bounding box to the smartphone 101. Attaching the backend PC 102 to the appropriate file system can provide access to the user's data stores. VNC may be used as the underlying platform for the *Mobile system due to the ready availability of open-source VNC clients. However, the design presented is agnostic to the specific remote computing solution 104.

There are various advantages to using remote computing for mobilization, including:

Zero software porting: Perhaps the most important advantage of mobilization using remote computing is that there is no porting of the application software required. The application still runs only on a PC, and merely a view is furnished to the smartphone.

Easy IT manageability: A by-product benefit of continuing to use PC applications even for smartphone users is that the management of the mobilization infrastructure can be done using existing IT processes, such as those for software updates.

Familiar interface: Since users have previously relied on the original PC application 105, the interface furnished through remote computing will continue to be familiar, and any functionality accomplishable using the PC could be performed from the smartphone.

One drawback with using remote computing for mobilization is that the application view from the PC is presented as-is on the smartphone without any transformations save for resolution scaling. The PC view is quite cumbersome to use on the smartphone, and several reasons contribute to the unwieldiness of the interface: (i) The bounding box of the application on the PC is typically much larger than the screen real estate on the smartphone. This raises a pan/zoom trade-off for the user. In a zoomed out mode, panning to reach different sections of the view is reduced, but the UI elements are too small to read or manipulate easily. Thus, once the user reaches the section of interest, a zooming in is almost always required. In a zoomed in mode, the user has better visibility of the UI elements, but the burden to pan increases considerably; (ii) Interfaces on the smartphone are typically layered due to the limited screen size. This requires more navigation by the user. For example, the first level keyboard exposed on smartphones is not a full keyboard, and requires additional clicks to reach special keys; (iii) Independent of the above issues that increase user effort, performing the same number of actions on the smartphone as on the PC is also subjectively burdensome to the user due to the constrained environment.

To study the above problems quantitatively, user-studies of three applications—Microsoft Project, Intuit Quickbooks, and Microsoft Word—were performed, mobilized using baseline remote computing. The objective metric of total number of actions (such as mouse clicks/keyboard entries) taken by each of the 10 participating users to complete pre-defined tasks were measured. A set of six commonly used tasks of varying difficulty levels for each of the three applications were used.

Figure 2A:
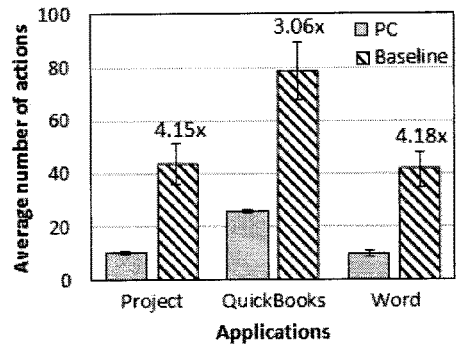
FIGS. 2a, 2b and 2c depict performance graphs of remote computer environments.
Figure 2B:
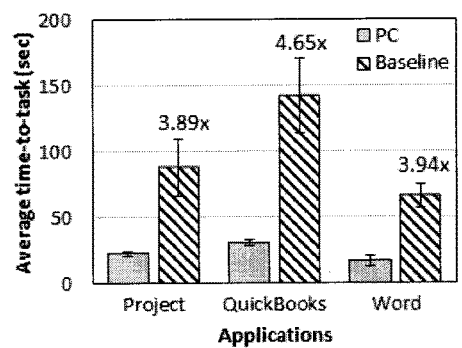

FIG. 2a shows the performance when the tasks are performed on the smartphone and PC respectively (with 90% confidence intervals). The average number of actions required on the smartphone is 3.1× to 4.2× of that required for the PC. Similarly FIG. 2b shows the average time required to perform the same tasks. Such inflation in user burden can directly be attributed to the reasons identified earlier.

Figure 2C:
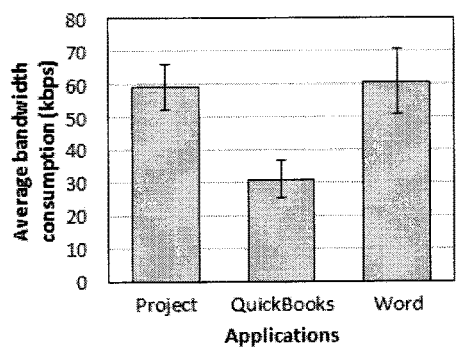

Another drawback of remote computing is the back and forth exchange of data between the server and client that could impose data usage burdens on the wireless link. The traffic consumed by the baseline remote computing solution for the three PC applications averaged over the six tasks per application was studied. The average traffic consumption for the three applications is presented in FIG. 2c and was 50.33 Kbps during the execution of a task. While not prohibitive, the performance would be an issue in cellular data networks where the available per user capacity can dip below the required data rates. Furthermore, with increasing trends toward usage based billing in cellular data networks, reducing the required data rate will also ease cost burdens.

The present invention therefore overcomes these and other limitations of prior remote computing solutions for mobilized applications.

Figure 3:
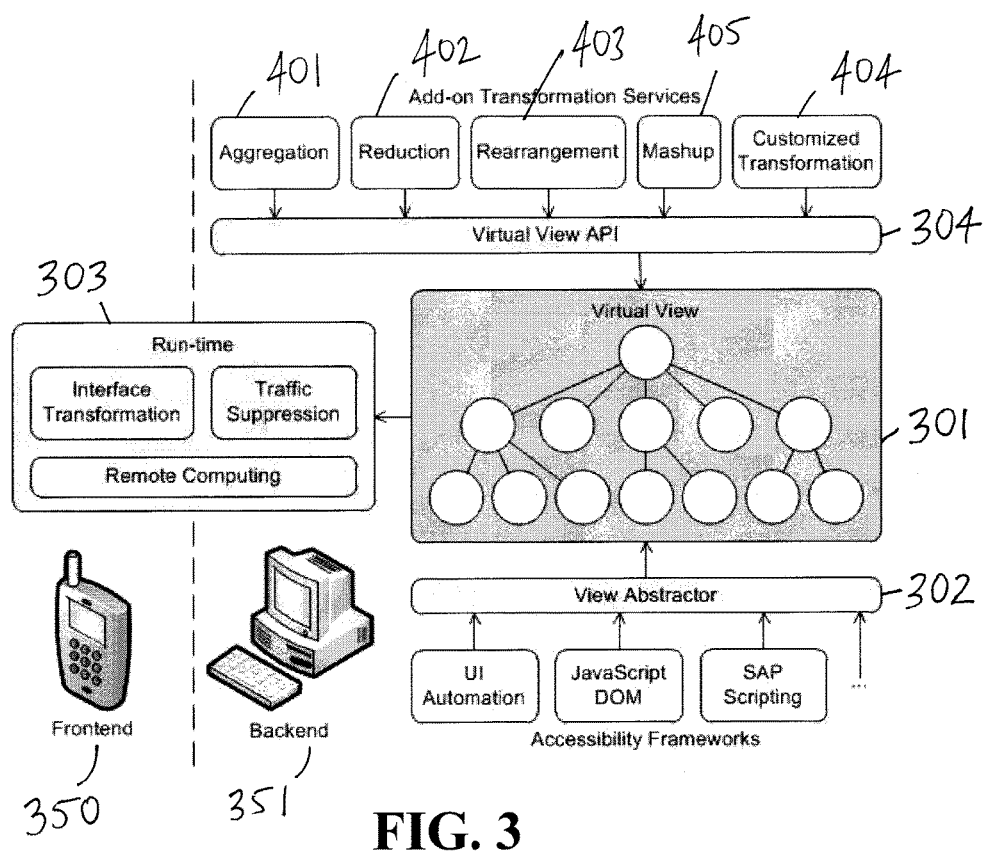
FIG. 3 is a block diagram of the present invention, in one embodiment.

The overall design of the *Mobile system and methodology will now be described. Unlike traditional remote computing that provides the view to a PC application as it is, *Mobile transforms the application view into a more mobile-friendly one for the smartphone 101. The key idea is to expose the application view as a set of UI elements that are easy to manipulate, and to build transformation services on the virtual view. Two attributes may be used to provide such a virtual view to any PC application—(i) most, if not all, PC applications use underlying UI frameworks for the creation of UI elements; and (ii) there are standardized accessibility approaches to tap into the UI frameworks. However, there may be multiple UI frameworks, and applications could use multiple frameworks simultaneously. Thus, there is a need for virtualizing application view into a uniform representation to make the implementation of transformation services easy. The *Mobile platform architecture, as shown in FIG. 3, includes the virtual view 301 as the core construct and the three high-level components around it—(i) the view abstractor 302 that creates the virtual view for each PC application, (ii) the run-time 303 that delivers and renders the virtual view to the smartphone frontend 350, and (iii) the virtual view API 304 that makes *Mobile a programmable platform for developing transformation services, which will be explained further below.

A virtual view 301 is an abstract representation of the user interface of a PC application. It may be a tree structure where each node corresponds to a UI element in the application, and each link represents the relationship between a container UI element and another UI element in the container. Such a tree-like structure naturally exists in any PC application created with a standard UI framework. Specifically, the root node of a virtual view represents the main window of a PC application. The window typically contains a menu bar, a tool bar, a status bar, and other UI elements. The children nodes further contain children nodes. For example, the menu bar contains several menu items, which may further contain sub-menu items.

For each node in a virtual view 301, we may define a set of attributes that can be used to describe a UI element created with a standard UI framework. Table 1 lists seven common attributes that may be extracted from the application view by the UI abstractor—(i) id is a unique identifier for the UI element; (ii) the type of a UI element can be button, menu item, text field, etc. (iii) location describes the coordinate of the UI element in the application view; (iv) size contains the width and height of the UI element; (v) state means information contained inside the UI element, such as the text in a text field or the checked state of a check box; and (vi) parent and children describe the hierarchy relationship in the tree structure of the virtual view. Beside those extracted from the application view, the virtual view 301 may add two attributes to the node that will be used by the run-time 303. The status of a node indicates the UI element to be shown or hidden by the run-time, and the template provides style descriptions in rendering the UI element.

TABLE 1

| Widget toolkit | NET | SAP | Web |
|---|---|---|---|
| Accessibility framework | UI Automation | SAP GUI Scripting | JavaScript and DOM |
| Attributes | | | |
| Id | (Name, LocalizedControlType, AutomationId) | (Name, Type, Id) | (Name, TagName, Id) |
| Type | LocalizedControlType | Type | TagName |
| Location | (Left, Top) | (Left, Top) | (OffsetLeft, OffsetTop, OffsetParent) |
| Size | (Right- Left, Bottom-Top) | (Width, Height) | (OffsetWidth, OffsetHeight) |
| State | Value and State | Value and State | Attributes |
| Parent | Ancestors.head | Parent | ParentNode |
| Children | Children | Children | ChildrenNode |
| Status | N/A: virtual view only | | |
| Template | N/A: virtual view only | | |
| Functions | | | |
| Read | Read from an attribute | | |
| Write | Write to an attribute | | |

TABLE 1-continued

| Invoke | Invoke | Execute Events | Click |
| --- | --- | --- | --- |
| OnOpen | MenuOpenedEvent WindowOpenedEvent | ContextMenuEvent, ChangeEvent | DOMNodeInserted DOMNodeInsertedIntoDocument |
| OnClose | MenuClosedEvent WindowClosedEvent | DestroyEvent DestroyEvent | DOMNodeRemoved, DOMNodeRemovedFromDocument |
| OnActivity | FromPoint, FocusedElement | FindByPosition, GuiFocus | OnClick, OnDblclick, OnKeyUp |

Besides the abovementioned static information, a virtual view 301 may also carry dynamic information in terms of the events that happen in the PC application 105. As shown in Table 1, three types of common events may be captured:—(i) an OnOpen event occurs when a view, such as a pop-up menu or a dialog, is opened in the PC application 105; (ii) an OnClose event occurs when a view is closed in the PC application 105; and (iii) an OnActivity event occurs whenever the user performs activity, such as a mouse click or a keystroke, on a UI element.

The UI abstractor 302 establishes a virtual view for each PC application 105 by extracting the information from the underlying UI framework in a generic, robust, and efficient manner. Most PC applications 105 construct their application view via a framework called widget toolkit that provides reusable modules for creating UI elements. The information of the UI elements created by a widget toolkit is typically accessible using a corresponding accessibility framework, which is used in assistive technology (ex. a screen reader) and automated UI testing in software development. For example, UI Automation provides view information of applications developed with Microsoft .NET framework. JavaScript provides access to the Document Object Model (DOM), which describes the UI elements in any web application. Enterprise application platforms also have their own accessibility frameworks (ex: SAP's accessibility framework is called SAP GUI Scripting. Similarly, other popular widget toolkits such as GTK+, Cocoa, Qt, wxWidgets, Java, and Flash all have corresponding accessibility frameworks.

The UI abstractor 302 may create a uniform representation of virtual views 301 for the mobilized applications by leveraging the accessibility frameworks. Although each accessibility framework has its own API, it typically provides UI information that may match with the generic representation of the virtual views 301. Table 1 shows how the attributes and events may be matched with those used in UI Automation, SAP GUI scripting, and JavaScript.

The UI abstractor 302 provides several advantages in virtualizing different accessibility frameworks into a common representation: (i) a single implementation of any view transformation service based on the uniform interface can work for multiple applications; (ii) it enables federated applications by allowing the view transformation services to work across multiple applications, examples of which are provided later with respect to the aggregation and mashup transformation service; and (iii) it creates a single view for an application that uses multiple widget toolkits. Examples include using a web application in a browser (.NET+web), applications with embedded web pages (SAP+web), web applications with embedded objects (web+Java applet and web+Flash).

Two core services may be used in providing a mobile-friendly view at run-time 303: delivery of the virtual view to the frontend 350, and rendering of the virtual view in the frontend 350. First, the interface transformation service renders the virtual view 301 as a more amenable and appropriate interface for the smartphone. It transforms each UI element in a virtual view 301 into a native UI element if a corresponding widget module is available in the smartphone platform; otherwise the element is called workspace and is rendered with the underlying remote computing. For example, mouse clickable tabs could be transformed into touchable buttons, and a pull down menu could be transformed into a spinner wheel. Rendering with native elements provides advantages including instant response in terms of the client-side UI interaction and a consistent look-and-feel as a smartphone app. Second, the traffic suppression service efficiently delivers the virtual view 301 to the frontend 350. While remote computing is needed for the workspace, the virtual view 301 is leveraged to intelligently suppressing and compressing the traffic consumption of underlying remote computing with three techniques: reducing the scope of screen update to the workspace, suppressing unnecessary requests for the transformed views, and leverage the long-term redundancy across multiple screen views with multi-frame encoding/decoding.

The virtual view provides a simple API 304 to allow easy implementation of view transformation services that further improves the performance of the mobilized applications. As shown in Table 1, the API 304 may provide three straightforward functions: the Read and Write functions allow a service to access the value of an attribute of a UI element, and the Invoke function allows a service to perform activity on a UI element, such as clicking a button. Besides, the API 304 allows any service to register to any event, and the service will be notified using a callback mechanism when an event occurs in the PC application.

Figure 4A:
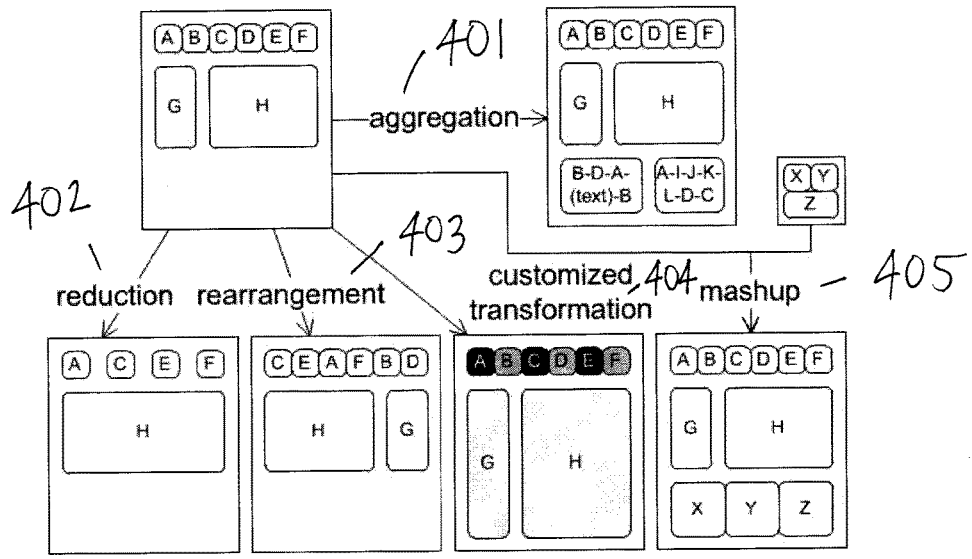
FIGS. 4a and 4b illustrate different ways of adapting view of a mobilized application on a smartphone.
Figure 4B:
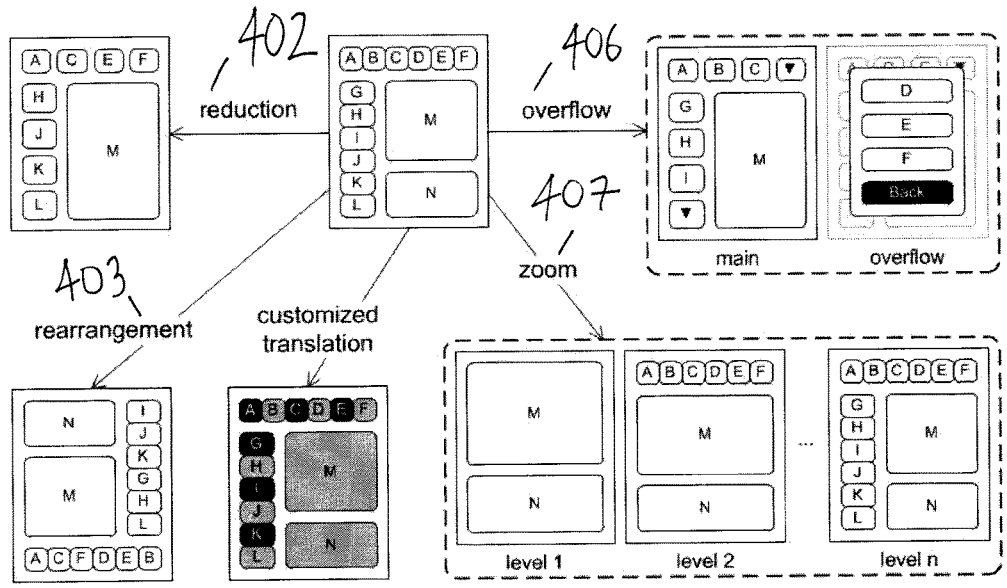

Several feature-rich add-on view transformation services can be built on top of the virtual view API 304. FIGS. 4a and 4b illustrate five different ways of adapting view of a mobilized application on a smartphone. The five services provide complementary functionality and can be used in tandem. While five add-on services are defined, these are by no means a comprehensive set. The five add-on services demonstrate the power of the virtual view API 304 described in the previous section and also show how the basic view transformation can be enhanced. For ease of deployment, all services may be hosted at the backend 351 and thus can be enabled for users without the need to make any change to the frontend 350 that has been installed in their smartphones.

The Aggregation service 401 allows a user to aggregate redundant activity while using the mobilized application. The service allows a user to aggregate actions for routine tasks and record them in to a single macro. A macro can then be accessed from the *Mobile frontend 350 to automate and also speed up the corresponding task execution.

If there are routine tasks that the user wants to perform from the smartphone, the service allows users to record a sequence of actions on different UI elements as a macro. The recording can be done on a PC that is much easier to manipulate, but it can also be done on a smartphone. While using the mobilized version of the PC application, macros recorded by the user are presented in the transformed view, and the user can replay the macro to quickly accomplish the same task from the smartphone.

The macro recording may be realized by listening to the OnActivity events and reading the id attributes of the associated UI elements. The list of macros recorded for a mobilized application may be presented as menu items in the menu bar. Playback of a macro may be realized by invoking the constituent UI elements with the recorded id attributes. The Aggregate service 401 can also be extended further to support parameters or custom values for certain actions during playback of a macro.

The macro presentation may be realized by writing new UI elements as children of a container node, such as menu items in the menu bar. The Aggregation service 401 can also support parameterization that allows a user to provide a different value for a parameter UI element in a routine task, such as the file name when saving a file. A parameter UI element can be identified by reading the type attribute, and the setting of the parameter value in runtime can be done by writing the value attribute of the UI element.

The Reduction service 402 provides a simplified view of the mobilized application by showing only a subset of the UI elements that the user wants to access from the smartphone. This helps to reduce a possible clutter of UI elements by eliminating some unused UI elements from the view. The reduction can be performed in one of the following ways: (a) manually choosing the useful UI elements or (b) automatically choosing only the frequently used subset of UI elements.

In one embodiment, two approaches may be used in deciding which UI elements to show: (a) the service allows the user to manually choose to hide certain UI elements from the transformed view; and (b) the service automatically choose the frequently used subset of UI elements to be shown in the smartphone.

The concept of reduction is to provide a simple application view in the mobilized application by showing only a subset of UI elements that the user wants to access from the smartphone.

The Reduction service 402 may be realized as follows. First, it registers to the OnOpen events. It writes the status attribute of the UI elements in a virtual view as shown or hidden to configure the subset of UI elements to be shown from the smartphone. It also uses the API to decide which UI elements to reduce. The service can provide an "edit mode" by adding a "show/hide" toggle button adjacent to each UI element. It can also listen to the OnActivity events to analyze user activity for automated reduction.

The Rearrangement service 403 presents a customized layout for the transformed view and allows configuration of the placement of the various UI elements in the view. This is particularly useful if the usage patterns of the mobilized application is different from the PC application and thus the original layout is no longer suitable.

The rearrangement service 403 may be realized by moving the nodes in the tree structure of the virtual view 301 by writing the children attribute. Similar to the reduction service 402, rearrangement 403 can be performed either manually or automatically, and either approach may be supported by the same functions in the virtual view API 304.

The Customized Transformation service 404 allows users to further customize the transformed view of the application. It allows a user to modify the look and feel of different UI elements by defining a custom template. This custom template may be used by the frontend 350 to render the different UI elements during runtime. In an Android environment, the template can be defined as an XML snippet that describes the style settings such as size, padding, margin, layout, look-and-feel, etc.

The concept of this service is to allow users to customize the transformation of the virtual view 301 in the smartphone. This may be performed by writing the template attribute of certain UI elements. The template is the metadata used to describe how a native element is rendered in the smartphone platform. In Android, the template may be an XML snippet that describes the characteristics such as size, padding, margin, layout, look-and-feel, etc.

The Mashup service 405 allows the user to federate UI elements from two or more different applications and show them as a single view on the smartphone. The federated application view allows the user to perform activity across multiple PC applications and/or get simultaneous view into them in a dashboard-like smartphone app. The service may be realized by reading the virtual view of one application and inserting its UI elements as children of certain UI elements of another application.

The Overflow service 406 intelligently splits a virtual view into multiple views to suit the smartphone environment. Because of the difference in form factor, the user interface of a PC application typically has more elements than that of a mobile app. When a virtual view 301 contains more elements than what can be fit into a smartphone screen, squeezing all elements into the small screen would result in a dense and unusable user interface. Overflow service intelligently organizes elements in a virtual view 301, presents a suitable number of elements for the smartphone screen, and hides the remaining elements in an "overflow" view visible on demand.

The Overflow service 406 improves the usability of a dense virtual view of lots of elements by intelligently splitting a virtual view into multiple views, including the main view and the overflow view. Only a set of number of elements are presented in the main view to suit the small screen of the smartphone, and the remaining elements are moved into "overflow" views that can be made visible on demand. Similar to the reduction service, the elements in the main view can be manually configured by the user, or automatically configured by the overflow service based on the usage frequency of the elements.

In one embodiment, there are two ways that an overflow view can be created for the remaining elements. The first one is a pop-up dialog that will be layered on top of the main view when invoked. The second one is an in-line expansion where the elements are stored in an invisible container, which is made visible when invoked. During run-time, the service registers to the OnOpen( ) and OnUpdate( ) events to reorganize the elements in the virtual view.

The Zoom service 407 allows a user to dynamically adjust the set of UI elements available in the mobile app from the frontend 350 on demand. It allows the user to define different zoom levels for a virtual view, ranging from simple but feature-limited ones with fewer elements, to feature-rich but complex ones with more elements. It may provide a control knob in the frontend 350 to allow the user to dynamically adjust the zoom level in run-time depending on what features the user wants to access.

The Zoom service 407 allows a user to adjust richness of the frontend 350 with several zoom levels. The lowest zoom level provides the simplest user interface with the most limited set of features, and the highest zoom level enables all features that the user wants to access from a smartphone. Each element in a virtual view 301 is associated to a zoom level. The zoom service registers to OnOpen( ) and OnUpdate( ) events and adds a knob to allow the user to adjust the zoom level from the frontend 350. When the user switches to a certain zoom level, all elements at a higher zoom level are removed from the virtual view 301, and then the updated virtual view 301 is sent to the frontend 350.

While the design of *Mobile system of the present invention can be applied to mobilize any PC application to any smartphone platform, in one embodiment Windows and Android may be used as the platforms. The UI abstractor 302 may construct the virtual view 301 with UI Automation, which is the most widely supported accessibility framework in Windows. The two core services in the run-time—interface transformation and traffic suppression—may be implemented with VNC as the underlying remote computing. TightVNC server may be used at the backend 351, and AndroidVNC may be used at the frontend 350. One of the add-on services, aggregation 401, may be implemented on top of the virtual view 301.

While any type of client device may be used, in one embodiment a Samsung Galaxy S smartphone running Android 2.1 with a 1 GHz CPU and 512 MB RAM may be used. The application proxy may be a Windows Server 2003. The *Mobile system may be built, in one of a variety of embodiments, by modifying the open-source AndroidVNC at the frontend 350 and TightVNC server at the backend 351. In one embodiment, three enterprise applications—namely Quickbooks Enterprise Solutions, MS Project and MS Word—are mobilized.

Figure 5A:
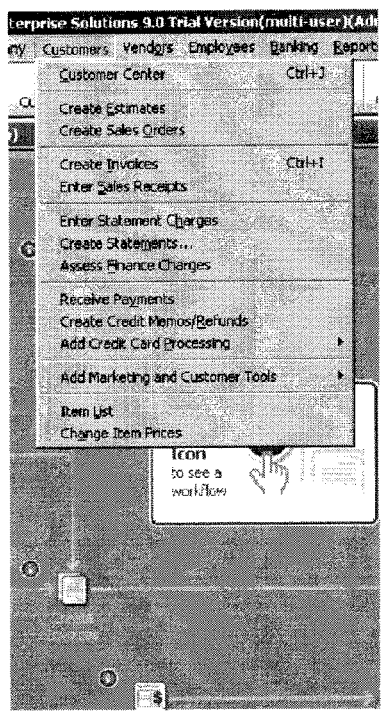
FIGS. 5a, 5b, 5c and 5d illustrate screenshots of the frontend of the present invention, in one embodiment.
Figure 5B:
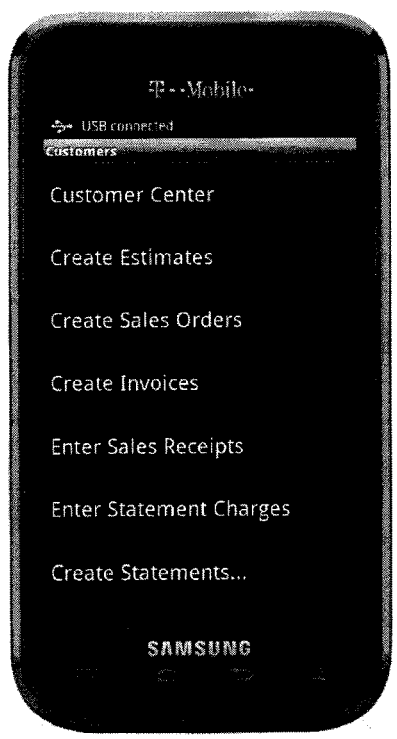
Figure 5C:
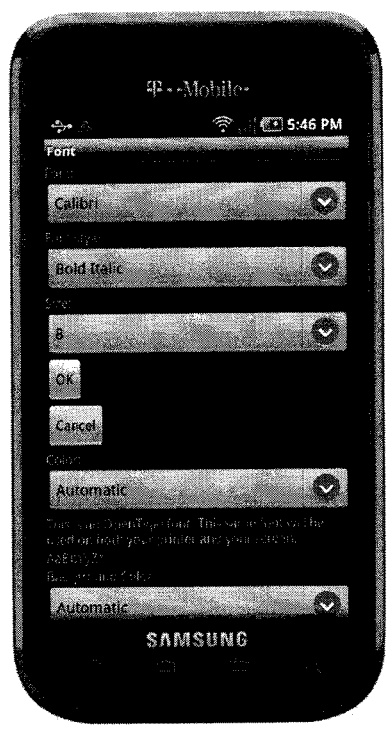

In FIGS. 5a and 5b. representative screenshots of the *Mobile frontend 350, in one embodiment, are depicted. FIGS. 5a and 5b show the default remote computing view and the transformed view of a menu of the Quickbooks application, respectively. How the different menu items have been transformed into a spinner interface on the smartphone can be seen. FIG. 5c shows a transformed dialog of MS Project. The transformed dialog shows different UI elements of the Android UI framework, such as buttons, combo boxes and text labels.

The performance of the interface transformation service were evaluated. Ten volunteers were invited from both academia and industry. The volunteers were picked to represent diversity across age-groups (25-40), gender and employer type (university, start-up, and large enterprise). Eight of the volunteers were heavy smartphone users. Each user was asked to perform one representative task for each of the three applications and using all three interfaces (PC, baseline mobilization based on VNC, and *Mobile).

Figure 6A:
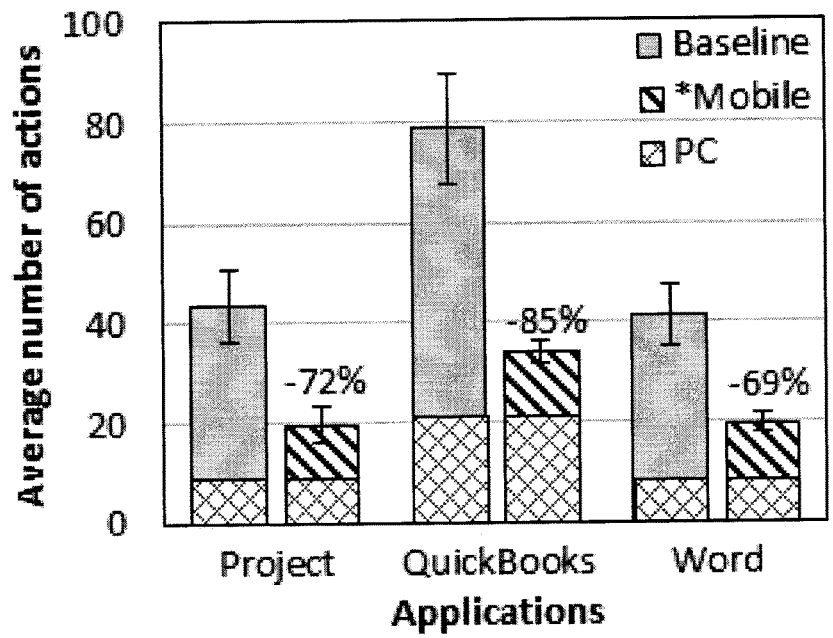
FIGS. 6a, 6b, 6c and 7 are graphs showing the performance of the present invention, in various embodiments.
Figure 6B:
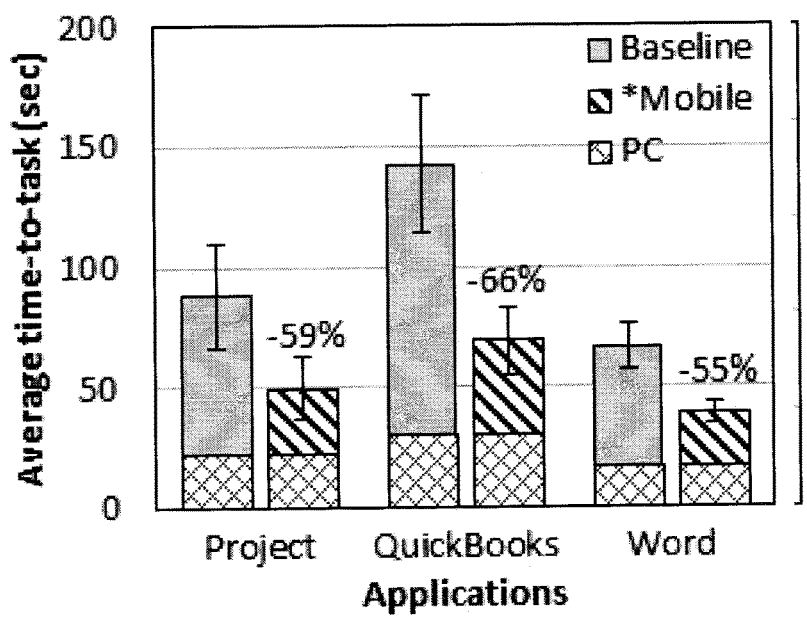

FIG. 6a shows the average time taken in accomplishing a task of the applications from the smartphone (with 90% confidence interval). The time taken on a PC is also shown in the figure as the benchmark comparison. Since the user interface in the PC applications is already optimized, the time-to-task we can achieve in a mobilized app can only equal to or greater than that of PC. As shown in the figure, the *Mobile system of the present invention provides up to 66\% of the achievable performance enhancement from smartphones. FIG. 6b shows the average task effort, which is defined as the number of actions required in accomplishing a task. *Mobile achieves up to 85% of the achievable performance enhancement.

Figure 6C:
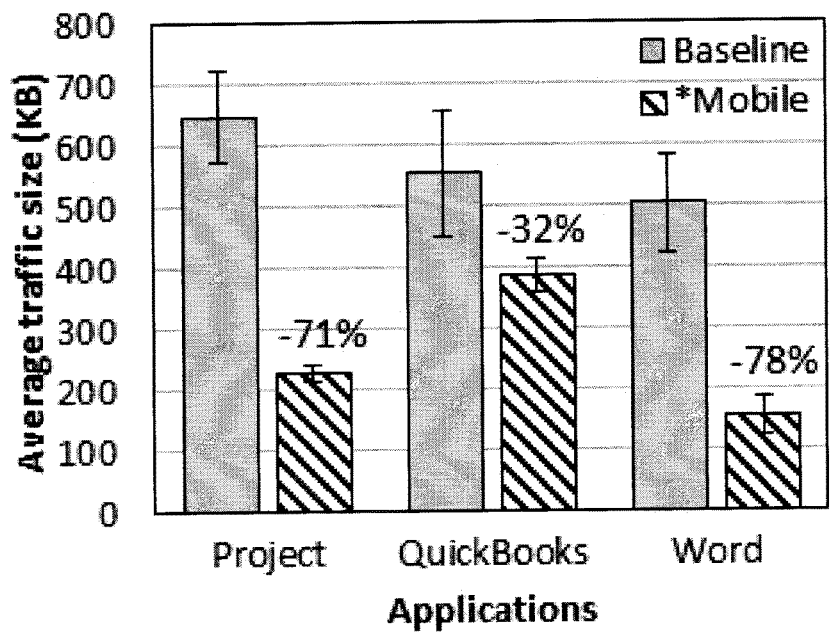

With respect to data traffic consumption, the traffic consumption was measured when the users used the baseline and *Mobile from the smartphone in the experiments. As shown in FIG. 6c, the traffic suppression service in *Mobile is able to reduce the traffic size by more than half in Microsoft Project and Microsoft Word, and about one third of traffic is reduced in Intuit QuickBooks.

The reason for the better reduction ratio in Project and Word may be attributed by the higher redundancy existing in the usage of the two applications. Common operations in the two application cause switches between different views and this results in frequent redundant updates. For example, users switch between different Ribbon tool bars when using both applications. Here the multi-screen buffering algorithm helps in reducing the traffic. While menus in QuickBooks also cause redundant updates, those updates have a smaller size.

Figure 5D:
Figure 7:
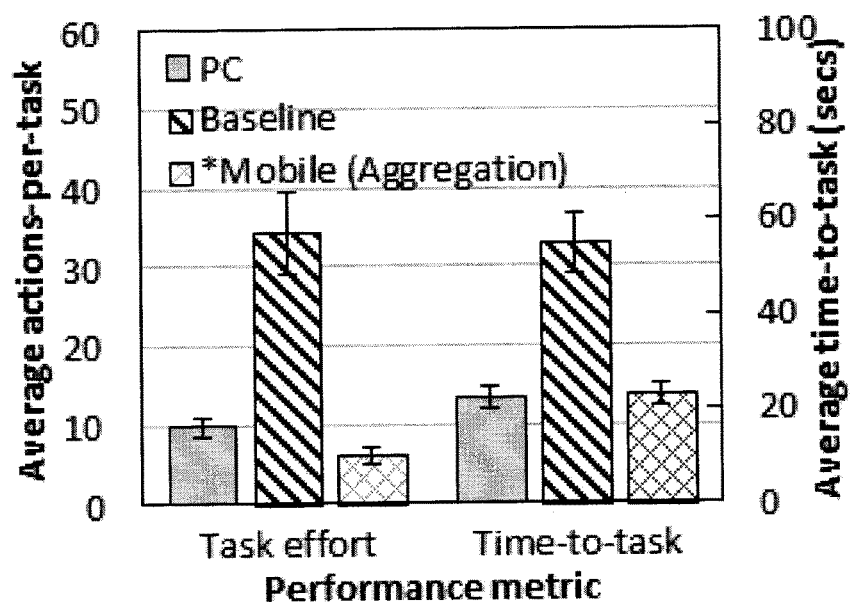

FIG. 5d shows a list of all available macros that are created using the aggregation service 401. Since the performance of aggregation may be more dependent on the nature of the aggregated operations, a more extensive experiment was conducted by inviting 22 volunteer users to perform 54 tasks using 9 PC applications. FIG. 7 shows the performance in terms of the task effort and time-to-task. Aggregation is able to reduce task effort by 83% and time-to-task by 58%.

The various embodiments of the present systems and methods can be operational with numerous other general purpose or special purpose computing system environments or configurations. Examples of well-known computing systems, environments, and/or configurations that can be suitable for use with the systems and methods comprise, but are not limited to, personal computers, server computers, laptop devices or handheld devices, and multiprocessor systems. Additional examples comprise wearable devices, mobile devices, set top boxes, programmable consumer electronics, network PCs, minicomputers, mainframe computers, distributed computing environments that comprise any of the above systems or devices, and the like.

The processing effected in the disclosed systems and methods can be performed by software components. The disclosed systems and methods can be described in the general context of computer-executable instructions, such as program modules, being executed by one or more computers or other computing devices. Generally, program modules comprise computer code, routines, programs, objects, components, data structures, etc., that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive. Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure being indicated by the following claims.

What is claimed is:

1. A method for transforming an application user interface from an application on a remote computer to a mobile user interface on a mobile device, comprising:
   a. extracting, through the use of a user interface abstractor, attributes of the application user interface elements by calling upon an accessibility framework associated with the application user interface;
   b. generating a virtual view directly from the extracted attributes, wherein the virtual view is an abstract representation of the application user interface including user interface elements from the application based upon the attributes of the application user interface elements, wherein the application user interface elements are represented as mobile user interface elements, wherein a first portion of the mobile user interface elements are native elements;
   c. applying a sequence of transformations on the virtual view to transform a second portion of the mobile user interface elements into workspace elements based upon the corresponding application user interface elements;
   d. transmitting to the mobile device the transformed virtual view; and
   e. rendering the transformed virtual view on the mobile device by rendering the native elements on the mobile device and rendering the workspace elements on the remote computer.

2. The method of claim 1, wherein the accessibility framework comprises a plurality of accessibility frameworks, and wherein the virtual view is a single virtual view of the extracted application user interface elements from the plurality of accessibility frameworks.

3. The method of claim 1, wherein the user interface abstractor further comprises calling upon a toolkit framework associated with the application user interface to extract the attributes of the elements of the application user interface.

4. The method of claim 1, wherein the attributes of the application user interface elements comprise a unique identifier, a type, a location, a size, and a state.

5. The method of claim 4, wherein the attributes further comprise event attributes.

6. The method of claim 4, wherein generating the virtual view further comprises associating template and status attributes to the application user interface elements.

7. The method of claim 1, wherein the attributes are utilized in read, write, and invoke functions.

8. The method of claim 1, further comprising aggregating redundant activity on the transformed virtual view through the workspace elements.

9. The method of claim 1, further comprising reducing the number of the mobile user interface elements displayed in the transformed virtual view.

10. The method of claim 1, further comprising rearranging orientation of the mobile user interface elements in the transformed virtual view.

11. The method of claim 1, wherein the application comprises at least two applications, and further comprising federating mobile user interface elements from the at least two applications into the transformed virtual view.

12. The method of claim 1, further comprising splitting the transformed virtual view into multiple transformed virtual views.

13. A method for transforming an application user interface from an application on a remote computer to a mobile user interface on a mobile device, comprising:
   a. extracting attributes of the application user interface elements by calling upon an accessibility framework associated with the application user interface;
   b. generating a virtual view directly from the extracted elements, wherein the virtual view is an abstract representation of the application user interface including user interface elements from the application based upon the attributes of the application user interface elements, wherein the application user interface elements are represented as mobile user interface elements, wherein a first portion of the mobile user interface elements are native elements;
   c. applying a sequence of transformations on the virtual view to transform a second portion of the mobile user interface elements into workspace elements based upon the corresponding application user interface elements; and
   d. transmitting to the mobile device the transformed virtual view, whereby the transformed virtual view is configured to be rendered on the mobile device by rendering the native elements on the mobile device and rendering the workspace elements on the remote computer.

14. The method of claim 13, wherein extracting the attributes of the application user interface elements further comprises calling upon a plurality of accessibility frameworks associated with the application user.

15. The method of claim 14, wherein the virtual view is a single virtual view of the extracted application user interface elements from the plurality of accessibility frameworks based upon the association of the attributes.

16. A system for transforming an application user interface from an application on a remote computer to a mobile user interface on a mobile device, the system comprising:
   a. a remote computing server configured to run on a backend with the remote computer, the remote computing server comprising a remote processor configured to:
      i. call on a user interface abstractor configured to extract attributes of elements of the application user interface of the remote computer by calling upon an accessibility framework associated with the application user interface;
      ii. call on a view abstractor configured to generate an abstract representation of the application user interface in the form of a virtual view directly from the extracted attributes, wherein the virtual view includes user interface elements based upon the attributes of elements of the application user interface, wherein the application user interface elements are represented as mobile user interface elements, wherein a first portion of the mobile user interface elements are native elements;

iii. apply a sequence of transformations to a second portion of the mobile user interface elements on the virtual view into workspace elements; and
iv. transmit to the mobile device the transformed virtual view; and
b. a remote computing client on the mobile device, the remote computing client configured to call on a mobile processor of the mobile device to:
i. render the transformed virtual view on the mobile device, wherein the native elements are rendered on the mobile device and the workspace elements are rendered on the remote computer.

17. The system of claim 16, wherein the user interface abstractor further calls upon a toolkit framework to extract the attributes of the elements of the application user interface.

18. The system of claim 17, wherein the accessibility framework and the toolkit framework comprise pluralities of accessibility and toolkit frameworks, wherein the view abstractor is further configured to generate a single virtual view of the extracted application user interface elements from the plurality accessibility and toolkit frameworks.

* * * * *

UNITED STATES PATENT AND TRADEMARK OFFICE
CERTIFICATE OF CORRECTION

| | |
|---|---|
| PATENT NO. | : 9,760,236 B2 |
| APPLICATION NO. | : 13/651593 |
| DATED | : September 12, 2017 |
| INVENTOR(S) | : Raghupathy Sivakumar et al. |

It is certified that error appears in the above-identified patent and that said Letters Patent is hereby corrected as shown below:

In the Specification

At Column 1, Line 14, please insert the following paragraph:
-- STATEMENT REGARDING FEDERALLY SPONSORED RESEARCH
This invention was made with government support under grant number 1017234 awarded by the National Science Foundation. The government has certain rights in the invention. --

Signed and Sealed this
Twenty-first Day of May, 2019

Andrei Iancu
*Director of the United States Patent and Trademark Office*